United States Patent
Wehe

(10) Patent No.: US 11,270,731 B2
(45) Date of Patent: Mar. 8, 2022

(54) METHODS AND APPARATUSES FOR COMPRESSING AND DECOMPRESSING DRIVE CURVES

(71) Applicant: Carl Zeiss Microscopy GmbH, Jena (DE)

(72) Inventor: Carsten Wehe, Weimar (DE)

(73) Assignee: Carl Zeiss Microscopy GmbH, Jena (DE)

( * ) Notice: Subject to any disclaimer, the term of this patent is extended or adjusted under 35 U.S.C. 154(b) by 305 days.

(21) Appl. No.: 16/378,000

(22) Filed: Apr. 8, 2019

(65) Prior Publication Data

US 2019/0311737 A1    Oct. 10, 2019

(30) Foreign Application Priority Data

Apr. 10, 2018  (DE) .......................... 102018108419.6

(51) Int. Cl.
| | | |
|---|---|---|
| *G06F 5/00* | (2006.01) | |
| *G03G 15/04* | (2006.01) | |
| *G02B 26/08* | (2006.01) | |
| *G11B 7/085* | (2006.01) | |
| *G02B 26/10* | (2006.01) | |
| *G06G 5/00* | (2006.01) | |

(52) U.S. Cl.
CPC ...... *G11B 7/08547* (2013.01); *G02B 26/0833* (2013.01); *G02B 26/10* (2013.01); *G03G 15/04* (2013.01); *G06G 5/00* (2013.01)

(58) Field of Classification Search
CPC ................ G03G 15/04; G11B 7/08547; G02B 26/0833; G02B 26/10; H03M 7/30; G06F 5/00
See application file for complete search history.

(56) References Cited

U.S. PATENT DOCUMENTS 8,643,650 B1 *  2/2014  Vinchon ............... G06F 17/175
                                                     345/442

FOREIGN PATENT DOCUMENTS

JP       2003-519945 A       6/2003

OTHER PUBLICATIONS

Li et al. "Research on Key Technology of Three-Dimensional Laser Scanning Data Processing" 2013 International Conference on Computer Sciences and Applications, Jun. 19, 2014, pp. 784-787.
Japanese Office Action corresponding to JP 2019-062474; dated May 19, 2020 (7 pages, including English translation).
Song et al. "PRESS: A Novel Framework of Trajectory Compression in Road Networks" Proceedings of the VLDB Endowment 7:661-672 (2014).

* cited by examiner

*Primary Examiner* — Sophia S Chen
(74) *Attorney, Agent, or Firm* — Myers Bigel, P.A.

(57) ABSTRACT

Methods and apparatuses for compressing drive curves for scanning devices and corresponding computer programs are provided. In this case, a drive curve is decomposed into segments. Segments which are not yet present in a library are stored in the library. Moreover, for each segment a pointer to a corresponding segment in the library is stored in a list.

25 Claims, 6 Drawing Sheets

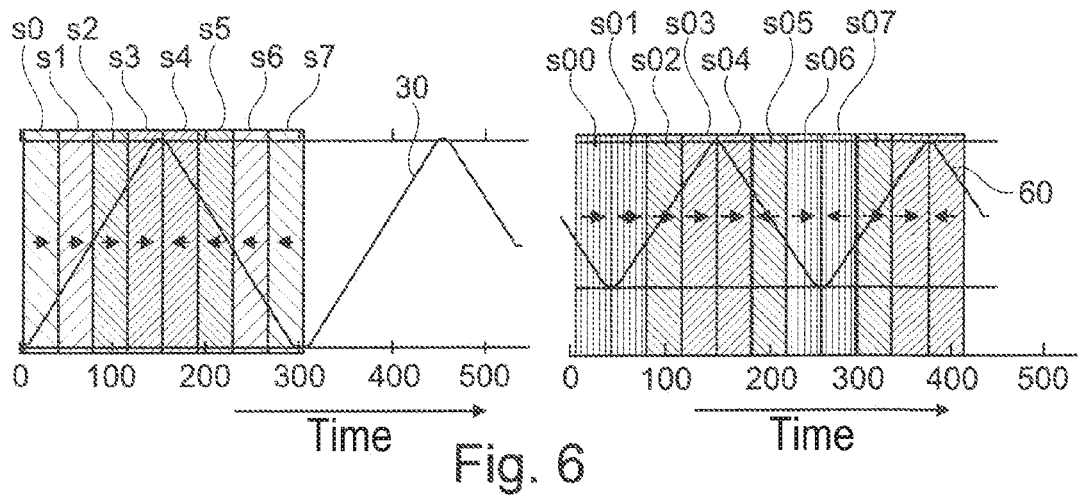
Fig. 6
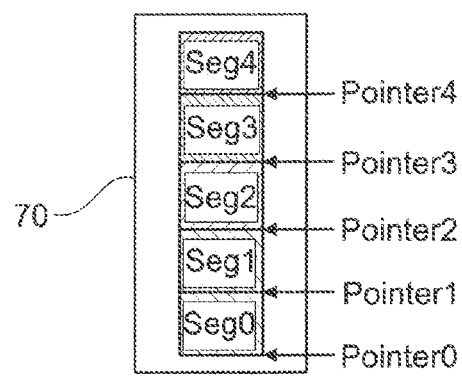
Fig. 7
Fig. 8

METHODS AND APPARATUSES FOR COMPRESSING AND DECOMPRESSING DRIVE CURVES

CROSS REFERENCE TO RELATED APPLICATIONS

This U.S. non-provisional patent application claims priority under 35 U.S.C. § 119 to German Patent Application No. 102018108419.6, filed on Apr. 10, 2018, the disclosure of which is incorporated herein in its entirety by reference.

FIELD

The present application relates to methods and apparatuses for compressing and decompressing drive curves and to systems comprising scanning devices which use such compression and decompression for drive curves for the scanning device.

BACKGROUND

Scanning devices are used, for example, to scan samples, for example with a light beam such as a laser beam. In the case of light beams, one or more moveable mirrors are often used for this purpose. A movement of said one or more mirrors then moves a light beam such as a laser beam on a sample, and a response to the illumination (for example luminance, fluorescence, light scattering and the like) can be measured. One example of systems of this type comprises laser scanning microscopes (LSM). In other applications, such as an atomic force microscope, for example, a sample is scanned using a tip, wherein the tip is moved over the sample.

SUMMARY

In this case, in many applications, such scanning is carried out using drive curves defining a voltage or current profile with which the scanning device is driven in order to scan the sample. By way of example, moveable mirrors such as galvanic mirrors, mirrors based on microelectromechanical systems (MEMS) or membrane mirrors can be driven with voltage profiles in order to control the mirror alignment and thus to define scanning of the sample or of a part of interest thereof.

Particularly in the case of a plurality of drive curves present in parallel (for example if two mirrors are used for scanning a sample in two dimensions), such drive curves may require a large amount of storage space. It is therefore an object to provide possibilities for compressing and decompressing such drive curves.

This object is achieved by means of methods and apparatuses as defined in the independent claims. The dependent claims define further embodiments and corresponding computer programs and systems.

In accordance with one exemplary embodiment, a computer-aided method for compressing drive curves for a scanning device is provided, comprising:
 subdividing a drive curve into segments, and
 for each of the segments:
  checking whether a segment corresponding to a respective segment of the segments (i.e. to a currently examined segment) is present in a library,
  if no corresponding segment is present in the library, incorporating the segment as segment corresponding to the respective segment into the library, and
  incorporating a pointer indicating the corresponding segment (currently incorporated segment or segment already present) in the library into a pointer list.

In this case, a computer-aided method is a method which is implemented on a suitable computing unit such as a computer, a Digital Signal Processor (DSP), or a correspondingly configured hardware component such as an Application-Specific Integrated Circuit (ASIC) or a Field Programmable Gate Array (FPGA).

A corresponding segment can be present in the library if a segment identical to the respective segment is present in the library.

In another exemplary embodiment, a corresponding segment is present in the library if a segment that differs from the respective segment by not more than a predefined measure is present in the library. In this case, the measure can be e.g. a threshold value for the mean squared deviation or some other metric.

An efficient compression of the drive curves can be achieved in this way.

Alternatively, a segment corresponding to the respective segment can be present in the library if a segment that is transformable into the respective segment is present in the library, wherein in this case incorporating the pointer to the segment into the pointer list additionally comprises incorporating into the pointer list one or more transformation parameters defining a transformation of the corresponding segment in the library to the respective segment.

The at least one transformation parameter can comprise a read-out direction of the segment from the library.

The at least one transformation parameter can also comprise a sign with which that segment in the library which is indicated by the pointer is to be provided.

The at least one transformation parameter can also comprise an offset and/or a scaling factor for that segment of the library which is indicated by the pointer.

The use of such transformation parameters makes it possible to further reduce a storage requirement in some exemplary embodiments.

The method can be applied to a plurality of drive curves.

A plurality of channels can be operated in this way.

The library can be a shared library for the plurality of drive curves, which can reduce a storage requirement for the library.

The pointer list can be created separately for each drive curve.

Moreover, a computer program comprising a program code which, when executed on a processor, causes one of the methods described above to be carried out is provided.

In accordance with another exemplary embodiment, an apparatus for compressing drive curves for a scanning device is provided, comprising a computing device, which is configured for carrying out the method as described above, e.g. by means of the above computer program.

In accordance with a further exemplary embodiment, a computer-aided method for decompressing a drive curve for a scanning device is provided, comprising:
 reading from a pointer list a pointer indicating a segment in a segment library,
 reading from the library the segment which is indicated by the pointer,
 driving a data sink, which in particular can be a scanning device or can comprise such a scanning device—if appropriate with other components such as a regulator, on the basis of segment, and repeating the reading of the pointer, the reading of the segment and the controlling for a multiplicity of pointers in the pointer list.

Controlling the data sink on the basis of the segment can comprise controlling on the basis of a transformed segment, wherein at least one transformation parameter for transforming the segment read from the library is read together with the pointer from the pointer list.

The at least one transformation parameter can comprise a read-out direction of the segment from the library.

The at least one transformation parameter can also comprise a sign with which that segment in the library pointed to by the pointer is to be provided.

The at least one transformation parameter can also comprise an offset and/or a scaling factor for that segment of the library which is indicated by the pointer is to be provided.

The use of such transformation parameters makes it possible to further reduce a storage requirement in some exemplary embodiments.

The method can be carried out for a plurality of pointer lists defining a plurality of drive curves, wherein the processes of reading the pointer, reading the segment and controlling the data sink are carried out alternately for the multiplicity of lists. In this case, "alternately" includes the possibility that the lists are not read out uniformly, rather some lists can also be read out more often than other lists, that is to say that the alternation can take place uniformly or non-uniformly.

A plurality of channels can be operated in this way.

In this case, reading the pointers and reading the segment can be carried out by means of a direct memory access apparatus (DMA apparatus).

Reading the segment from the library can comprise reading one or more packets from the library, wherein the packets are transmitted to the data sink.

In this case, packets assigned to different lists can be transmitted alternately. By means of a synchronization device, a synchronized, in particular simultaneous, driving of different data sinks can be implemented here, even in the case of non-uniform read-out of the lists and thus different data rates of the driving for different channels.

Moreover, a computer program comprising a program code which, when executed on a computing device, causes one of the above methods for decompression to be carried out is provided.

In accordance with another exemplary embodiment, an apparatus for decompressing a drive curve for a scanning device is implemented, comprising a computing device, which is configured to carry out the method for decompression as described above. In this case, a computing device can comprise a computer, but also specifically configured hardware components such as an Application-Specific Integrated Circuit (ASIC) or a Field Programmable Gate Array (FPGA).

Moreover, a system is provided, comprising:
a scanning device for scanning a sample, and
at least one apparatus as described above.

BRIEF DESCRIPTION OF THE DRAWINGS

Various exemplary embodiments are explained in greater detail below with reference to the accompanying drawings. In the figures:

FIGS. 6-8 are diagrams for illustrating the method from FIG. 3 for a plurality of drive curves.

DETAILED DESCRIPTION

Various exemplary embodiments are explained in detail below. These exemplary embodiments serve merely for elucidation and should not be interpreted as restrictive. By way of example, a description of an exemplary embodiment with a multiplicity of features should not be interpreted to the effect that all these features are necessary for implementation. Rather, in other exemplary embodiments, some of the illustrated components or method steps can be omitted and/or replaced by alternative components or method steps. In addition to the components and method steps explicitly illustrated, it is possible to use further components and method steps, for example components and method steps used in conventional apparatuses and systems which use scanning devices.

Figure 1:
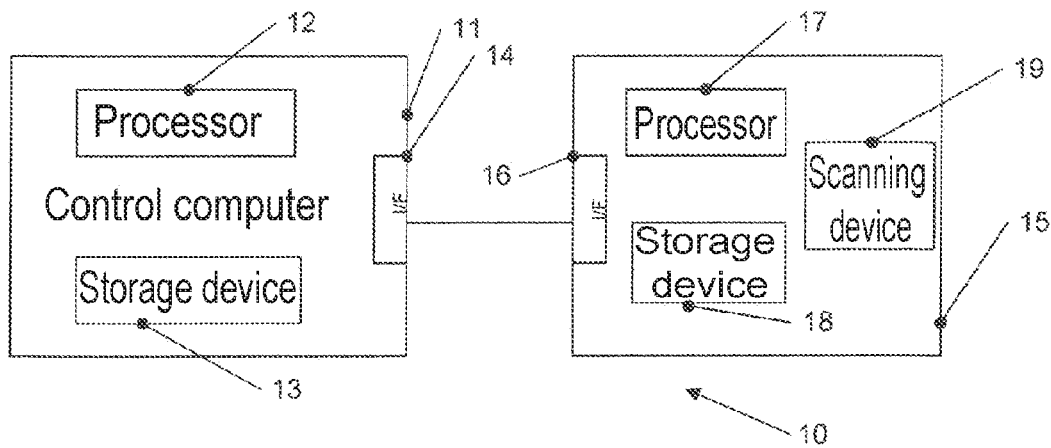
FIG. 1 is a block diagram of a system in accordance with one exemplary embodiment.

FIG. 1 shows a block diagram of a system in accordance with one exemplary embodiment. The system 10 comprises a control device 11 and an apparatus 15, which is controllable by means of the control device 11.

The control device 11 can comprise a correspondingly programmable computer or other computing devices, e.g. other processors such as a Digital Signal Processor (DSP) or else fixed-programmed hardware components such as Application-Specific Integrated Circuits (ASICs) or Field Programmable Gate Arrays (FPGA).

In the exemplary embodiment illustrated, the apparatus 15 comprises a scanning device 19 as described in the introduction, by means of which e.g. a sample can be scanned. In the case of optical scanning using a laser beam, for example, the scanning device 19 can contain one or more mirrors, for example galvanic mirrors, mirrors based on a microelectromechanical system (MEMS mirrors), membrane mirrors and the like. In some exemplary embodiments, the apparatus 15 can be a laser scanning microscope, but is not restricted thereto.

In particular, one or more drive curves for the scanning device 19 are defined in the control device 11, said one or more drive curves controlling and determining the scanning of the scanning device. Defining the drive curves can be done in any conventional way, for example by means of user inputs, by means of the marking of a region of interest of a sample by a user and subsequent automatic determination of a drive curve for scanning said region of interest and the like. These procedures are known per se and therefore will not be explained in greater detail.

The control device 11 carries out a compression of the one drive curve or the plurality of drive curves, as will be explained in greater detail later with reference to FIGS. 2-8. For this purpose, in the case of a computer as control device 11, it is possible to use a computer program running on a processor 12 of the control device 11, said computer program being stored in a storage device 13 of the control device 11, and/or specific hardware components. In the storage device 13, it is then possible to store the compressed drive curves in the form of a pointer list and a library, as will be explained in greater detail later. The drive curves can be present in particular as a sequence of points, i.e. as a sequence of values over time, in digital form.

The compressed data are transferred to the apparatus 15 by means of an interface 14, said apparatus having an interface 16 for this purpose. The transfer can be carried out for example in a wired manner, wirelessly or optically. The transfer can be carried out for example via an LVDS bus, but is not restricted thereto. In the example illustrated, the apparatus 15 has a processor 17 with a storage device 18. The compressed data are stored in the storage device 18 and decompressed, e.g. by means of a computer program running on the processor 17. Instead of a correspondingly programmable processor such as the processor 17 or in addition thereto, the apparatus 15 can also comprise other types of computing devices, e.g. specific hardware components such as ASICs or FPGAs. The scanning device 19 is then driven on the basis of the decompressed drive curves. In this case, e.g. components of the scanning device such as moveable mirrors can be driven directly or else indirectly via a regulator. In other exemplary embodiments, other data sinks that are intended to be driven in accordance with the drive curves can be driven.

In this case, the storage devices 13, 18 can comprise any suitable storage devices such as Random Access Memories (RAM), Flash memories, magnetic storage media such as hard discs or optical storage media. Details concerning the decompression of the compressed drive curves will be explained later with reference to FIGS. 9-11. As a result of the compression, in this case in the exemplary embodiment in FIG. 1, in particular, the quantity of data that must be transferred from the control device 11 to the apparatus 15 is reduced.

While FIG. 1 shows separate apparatuses in which the compression and decompression take place (compression in the control device 11 and decompression in the apparatus 15), this should not be interpreted as restrictive, and the two processes can also be carried out in a single apparatus, wherein for example drive curves are received successively by the apparatus and are stored in compressed form in a storage device in order thus to reduce a storage requirement in the apparatus. The division in FIG. 1 should thus be understood merely as an example.

One exemplary embodiment of a method for data compression will now be explained with reference to FIG. 2, which shows a flow diagram of a method in accordance with one exemplary embodiment. For better elucidation of the method in FIG. 2, reference is additionally made to FIGS. 3-5, which illustrate one example of compression by means of the method in FIG. 2. The example shown in FIGS. 3-5 illustrates the compression of a specific drive curve and should therefore be understood merely as an example, since other drive curves can be compressed in a similar way.

Figure 2:
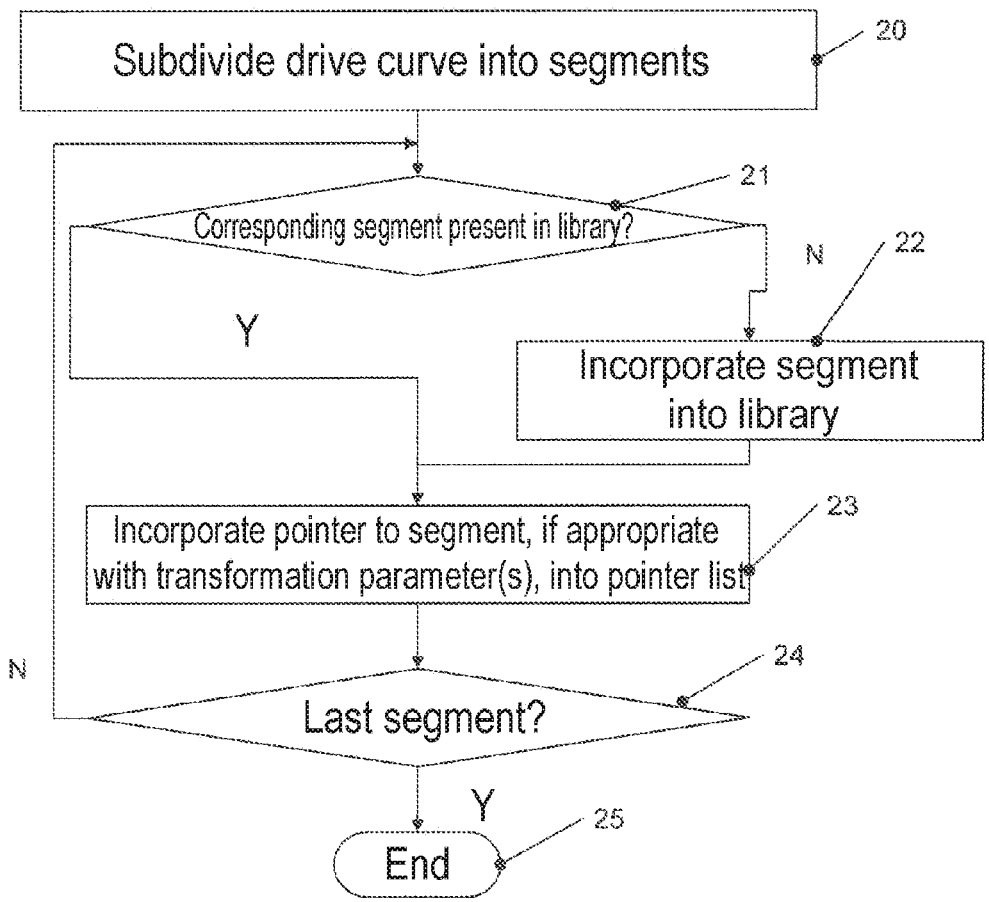
FIG. 2 is a flow diagram of a method for compressing drive curves in accordance with one exemplary embodiment.

In a step 20 in FIG. 2, a drive curve is subdivided into segments. In this case, segments are time segments of the drive curve. Preferably, all the segments have the same length, wherein a subdivision into segments of different lengths is also possible, in principle, but can make more difficult the calculations necessary for the compression.

Figure 3:
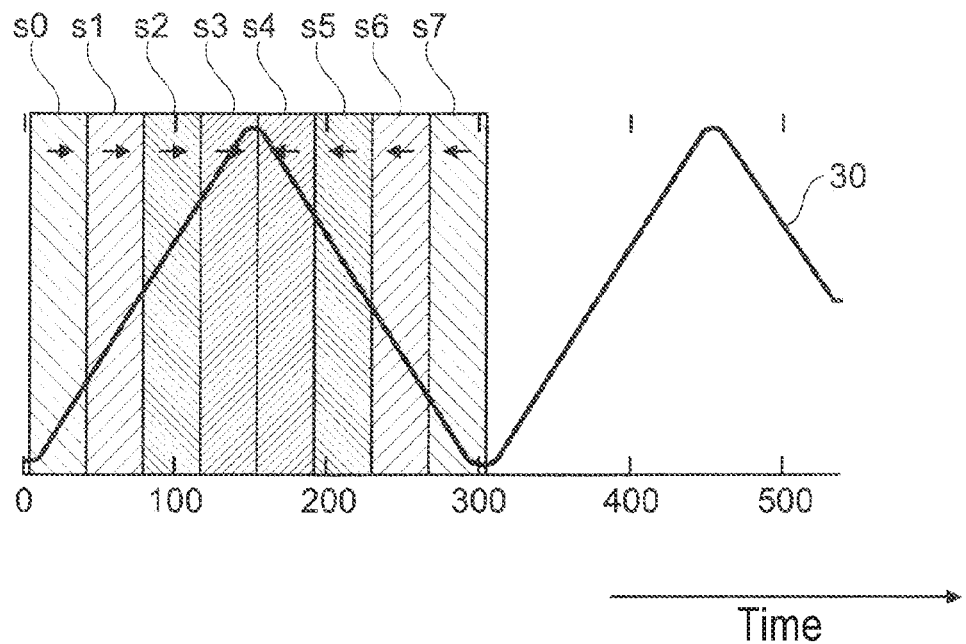
FIGS. 3-5 are diagrams for illustrating the method from FIG. 3.
Figures 4, 5:
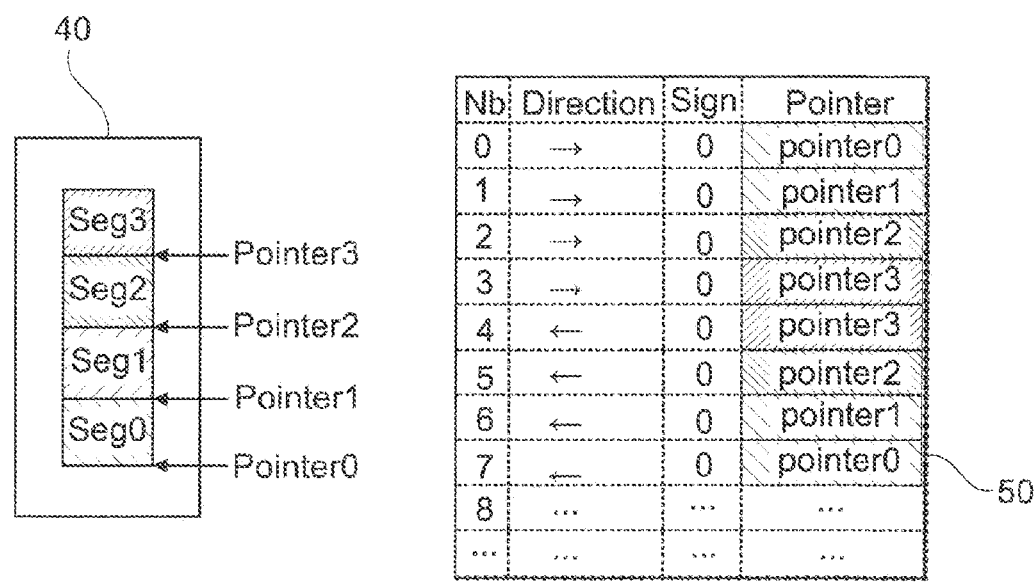

One example of such a subdivision into segments is illustrated schematically in FIG. 3. FIG. 3 shows as an example a drive curve 30, which is a periodic, approximately triangular drive curve in this case. On the basis of such a drive curve, an analogue drive voltage can be generated by means of a digital-to-analogue converter, for example, by means of which drive voltage a mirror is then driven, which then moves back and forth periodically, for example.

Said drive curve 30 is subdivided into segments of equal length, of which segments s0-s7 are shown in FIG. 8. The rest of the drive curve 30 is likewise subdivided into segments (not illustrated in FIG. 3).

After this subdivision, the segments are processed successively. Step 21 involves checking whether the corresponding segment is present in a segment library. If this is not the case, at 22 the segment is incorporated into the library. In this case, a corresponding segment can be an identical segment or a segment which can be converted into the currently examined segment by means of a transformation. A transformation can include for example a read-out direction, a change of sign, an addition of an offset or a scaling with a scaling factor. Examples thereof will additionally be explained later. In other exemplary embodiments, a corresponding segment can also be a segment which differs from the respective currently processed segment—if appropriate with the inclusion of a transformation—by not more than a predefined measure. The measure can define for example a threshold value for a metric used to measure a deviation between the segments. Suitable metrics comprise a squared deviation (here the squares of the differences between points of the segments are added up), or a sum of the absolute deviations (here the absolute values of the differences between points of the segments are added up).

In step 23, a pointer to the segment in the library, if appropriate with transformation parameters describing a transformation to transform the segment in the library into the currently examined segment, is then incorporated into a pointer list.

In this case, a pointer should generally be understood as information making it possible to read out a corresponding segment from the library. By way of example, the pointer can point directly to a memory address of the segment in a storage device; however, the pointer can also identify the segment in some other way, wherein in the latter case the information from the pointer is then converted into a memory address, for example.

Step 24 involves checking whether the currently examined segment is the last segment of the drive curve. If this is not the case, the method is continued with the next segment in step 21. If this is the case, the drive curve has been completely compressed and the method is ended in step 25.

This will now be explained in even greater detail on the basis of the example. In this respect, FIG. 4 shows an example of a library 40 in which segments are incorporated in step 22, and FIG. 5 shows an example of a pointer list 50.

In this case, the illustration that now follows assumes that a library does not yet exist and said library is then newly created.

In the first pass of the method, the segment s0 is analysed. Since there is not yet an entry present in the library, there is not yet a corresponding segment present in the library, and the segment is incorporated as Seg0 into the library 40. A pointer, Pointer 0, points to the segment Seg0 in the library 40. Correspondingly, said Pointer 0 is incorporated in the pointer list at the first position (position Nb=0 in FIG. 5). In the example illustrated, a read-out direction and a sign are additionally available as transformations. The read-out direction of the segment for reconstructing s0 is intended to be implemented in the forward direction, which is illustrated by an arrow towards the right in FIG. 5. That is to say, in this case, that the segment s0 of the drive curve 30 in the form present in FIG. 5 is stored as Seg0. A change of sign is likewise not necessary, this being represented by a 0 in FIG. 5.

A transition is then made to the second segment s1 during the next pass of the method. Here, likewise, there is not yet a corresponding segment present in the library, and the segment s1 is stored as Seg1 in the library 40, pointed to by a pointer, Pointer 1. Correspondingly, said Pointer 1 is incorporated into the pointer list 50 at the second position (Nb=1), with read-out direction in the forward direction and no change of sign. This procedure is implemented in the same way for the third segment s2 and the fourth segment s3 of the drive curve 30. These are likewise not yet present in the library, and are incorporated into the library 40 as Seg2, pointed to by a pointer, Pointer 2, and Seg3, pointed to by a pointer, Pointer 3. Correspondingly, entries Pointer 2 and Pointer 3, each with read-out direction in the forward direction and without a change of sign, are entered next into the pointer list 50.

Next, in the method in FIG. 2, the segment s4 is analysed. The latter corresponds to the segment s3 in the opposite direction (from a high value to a low value instead of from the low value to the high value as in the case of segment s3). It is therefore ascertained here in step 21 that a corresponding segment (Seg3) is already present in the library. Therefore, for the segment s4 once again Pointer 3 is stored (at position Nb=4) in the pointer list 50, and the fact that the read-out must be carried out in the reverse direction is additionally stored as transformation parameter, this being symbolised by an arrow towards the left in FIG. 5.

The same correspondingly applies to the segment s5, which corresponds to the segment s2 in the opposite direction, the segment s6, which corresponds to the segment s1 in the opposite direction, and the segment s7, which corresponds to the segment s1 in the opposite direction. Accordingly, no further segments are stored for them in the library, and in the pointer list Pointer 2 is stored at the sixth position (Nb=5), Pointer 1 is stored at the seventh position (Nb=6) and Pointer 0 is stored at the eighth position (Nb=7), in each case with read-out direction in the reverse direction.

In the example in FIGS. 3-5, only the read-out direction and the sign were permitted as transformation parameters. In other exemplary embodiments, further transformations may also be made possible. In general, enabling additional transformations increases a computation time required for the compression, but can serve for a higher compression rate, i.e. a smaller storage space requirement for the compressed drive curve.

By way of example, an offset can be permitted as transformation parameter. In the example of the drive curve 30 in FIG. 3, the profile of the drive curve in the segments s1 and s2 is identical in principle, but with an offset with respect to one another. If the offset is permitted as transformation parameter, by way of example, only the segment s1 would be stored in the library 40, and for the segment s2 the pointer to the segment s1 in the library together with an associated offset would be stored in the pointer list. In other exemplary embodiments, additionally or alternatively, a scaling with a scaling factor is also possible, as a result of which for example the gradient of the segment can be altered. The possibility of the sign, which possibility has been explained with reference to FIGS. 3-5, constitutes a special case of such a scaling with a scaling factor in which only scaling factors of +1 and −1 are possible.

The method is continued in a corresponding manner for the rest of the drive curve 30. In the case of the drive curve 30, the segments s0-s7 are repeated periodically here, such that no new segments are stored in the library 40 in this case, and the pointer list 50 is continued periodically, that is to say that the illustrated entries in the rows Nb 0-7 are then repeated periodically starting from Nb=8.

The method in FIG. 2 is also applicable to a plurality of drive curves which are used for example for a plurality of channels for the control of different components of a scanning device. By way of example, two mirrors can be driven for the purpose of scanning in two dimensions, wherein the tilt axes of the mirrors are perpendicular to one another in order to enable two-dimensional scanning, or a sample can be scanned using two or more laser beams. In principle, the method as described in FIG. 2 can then be applied successively to a plurality of drive curves, wherein a shared library can be used, such that segments which occur in two or more drive curves are stored only once. This will now be explained with reference to FIGS. 6-8.

In the example in FIGS. 6-8, two drive curves are compressed using the method from FIG. 2, said drive curves being illustrated in FIG. 6. They are firstly the drive curve 30 already shown and explained in FIG. 3, and secondly a drive curve 60. As already mentioned, these two drive curves can for example drive different mirrors of a scanning device.

In step 20 from FIG. 2, the drive curves are subdivided into segments, as explained. In this case, the drive curve 30 is subdivided into the segments s0-s7, ... already discussed. The drive curve 60 is subdivided into segments s00, s01, s02, s03, s04, s05, s06, s07 ..., as shown in FIG. 6. In this case, the length of the segments into which the curves 30 and 60 are subdivided is identical in the exemplary embodiment in FIGS. 6-8, which facilitates the use of a shared library.

The method from FIG. 2 is then carried out for the segments of the drive curve 30 as described, as a result of which the segments s0-s3 are stored as segments Seg0-Seg3 with corresponding pointers, Pointer 0-Pointer 3, in a library 70 illustrated in FIG. 7, and the pointer list 50 illustrated again in FIG. 8 and corresponding to the pointer list 50 from FIG. 5 is created.

The segments of the drive signal 60 are then processed using the method from FIG. 2. The segment s00 is not yet in the library and is therefore added to the library 70 as Seg4 with an assigned pointer, Pointer 4. Pointer 4 with forward read-out direction is therefore added as first entry (Nb=0) in a pointer list 81. The segment s01 corresponds to the segment s00 in the opposite direction. Therefore, once again Pointer 4, this time with reverse read-out direction, is stored as second entry in the pointer list 81 (Nb=1).

The segment s02 of the drive signal 60 then corresponds to the segment s2 of the drive signal 30 which has already been stored as Seg2 in the storage device 70. Therefore, Pointer 2 with forward read-out direction is entered as third entry (Nb=2) into the pointer list 81. In a similar manner, the segment s03 corresponds to the segment s3 of the drive curve 30 which has already been stored as Seg3, and the segment s04 corresponds to said segment with opposite sequence. Therefore, Pointer 3 is next entered twice in the pointer list 81, once with forward read-out direction (Nb=3) and once with reverse read-out direction (Nb=4). In this way, a pointer list is gradually created for the curve 60, too, as shown in FIG. 8. In the case of two pointer lists as well, besides direction and sign, the abovementioned further transformation parameters such as offset or scaling can also be used in other exemplary embodiments. In the same way as explained above for two drive curves, the method can also be applied to three or more drive curves.

Figure 9:
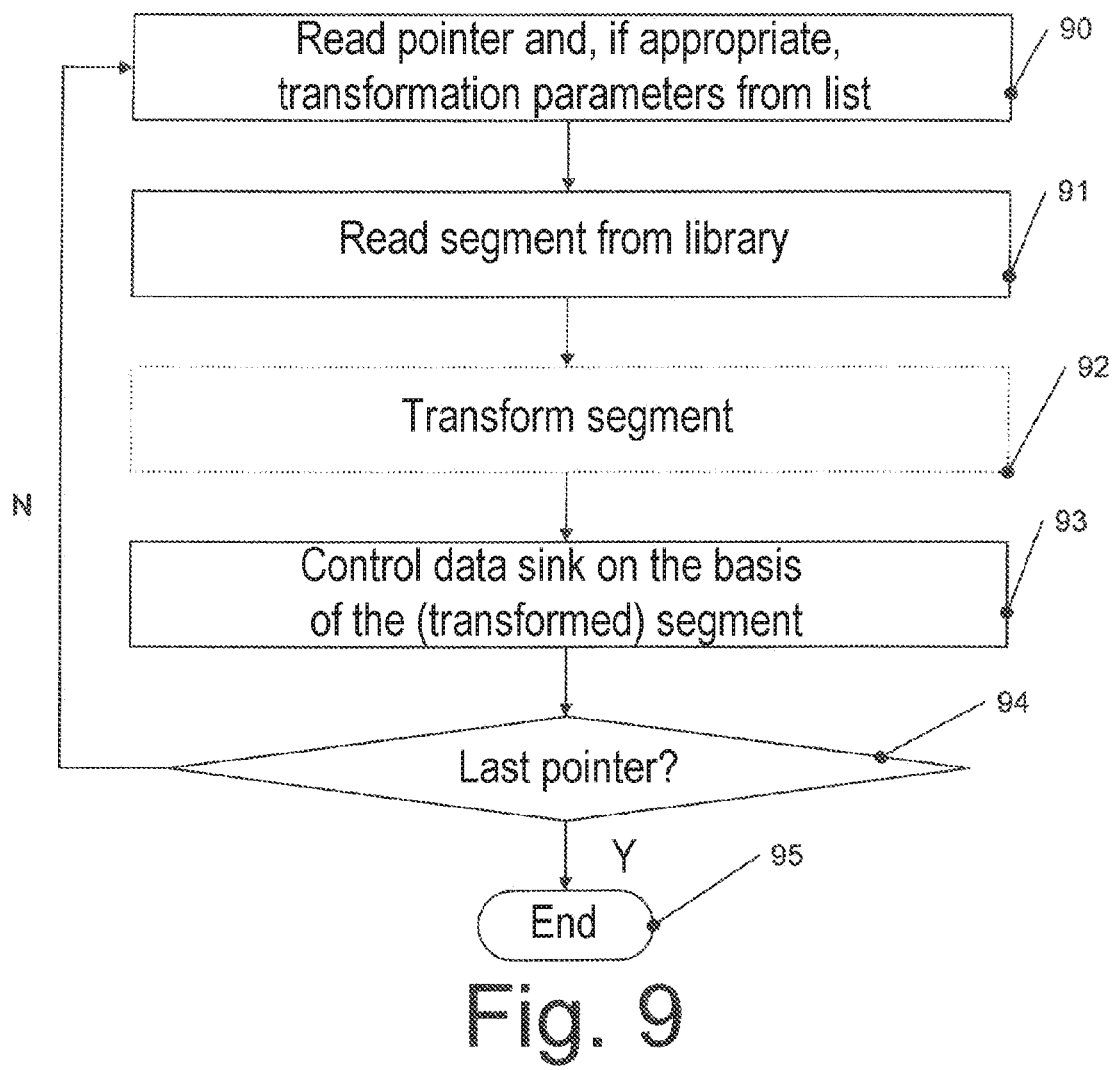
FIG. 9 is a flow diagram of a method for decompressing drive curves in accordance with one exemplary embodiment.

Next, with reference to FIG. 9, a method for decompressing drive curves that have been compressed in this way will be discussed with reference to FIG. 9. For explaining FIG. 9, reference is once again made to FIGS. 3-8.

Step 90 involves reading out a first pointer and, if appropriate, transformation parameters (if the latter are used) from a pointer list. In the case of the example in FIGS. 3-5, as entry in the row Nb=0, Pointer 0 is read out from the pointer list 50, together with the transformation parameter that the read-out has to be effected in the forward direction. In step 91, the segment pointed to by the pointer is then read out from the library, the segment Seg0 in the case of the list 50 and Pointer 0.

Optionally, then in step 92 the segment is transformed on the basis of the transformation parameters, for example the sign is changed. In the case of the read-out direction as transformation parameter, step 92 is carried out together with step 91, that is to say that the segment is read out from the library in the direction indicated by the transformation parameter. Alternatively, however, in this case, too, the transformation can be carried out in separate steps by the segment being read out first and then the sequence being reversed.

In step 93, a data sink, e.g. a scanning device, for example a mirror of the scanning device or a regulator that controls such a mirror, was then driven on the basis of the segment (if appropriate the transformed segment if the segment was transformed). By way of example, by means of an analogue-to-digital converter, the segment can be converted into a voltage profile with which for example a scanner mirror is driven.

In step 94, in some exemplary embodiments, a check is made to establish whether the pointer read out is the last pointer of pointers to be processed. This may be the case if the last pointer in the pointer list has been reached, i.e. in this case the pointer list is processed once. In another variant, this may additionally or alternatively be the case if a different termination condition has been met, for example a predefined number of segments and/or output values generated on the basis of the segments have been output. If this is the case, the method ends in step 95. If this is not the case, the method is continued with the next pointer in step 90.

In other exemplary embodiments, the pointer list is also repeated periodically. In such a case, after the last pointer of the pointer list has been processed, the method is continued with the first pointer of the pointer list. In this regard, a drive curve can be repeated periodically. This can be combined with the termination condition explained above.

It should be noted that step 93 need not necessarily be carried out separately for each segment, rather a plurality of or all the segments can also be combined and then the driving can be carried out.

In the case of a plurality of drive curves as explained with reference to FIGS. 6-8, the method in FIG. 9 can for example be carried out alternately for the different pointer lists, such that the pointer lists are read out in turn (round-robin method). This is helpful particularly if a plurality of components, for example a plurality of mirrors, are intended to be driven synchronously with one another and substantially simultaneously with the drive curves. This will also be explained below with reference to FIGS. 10 and 11.

Figure 10:
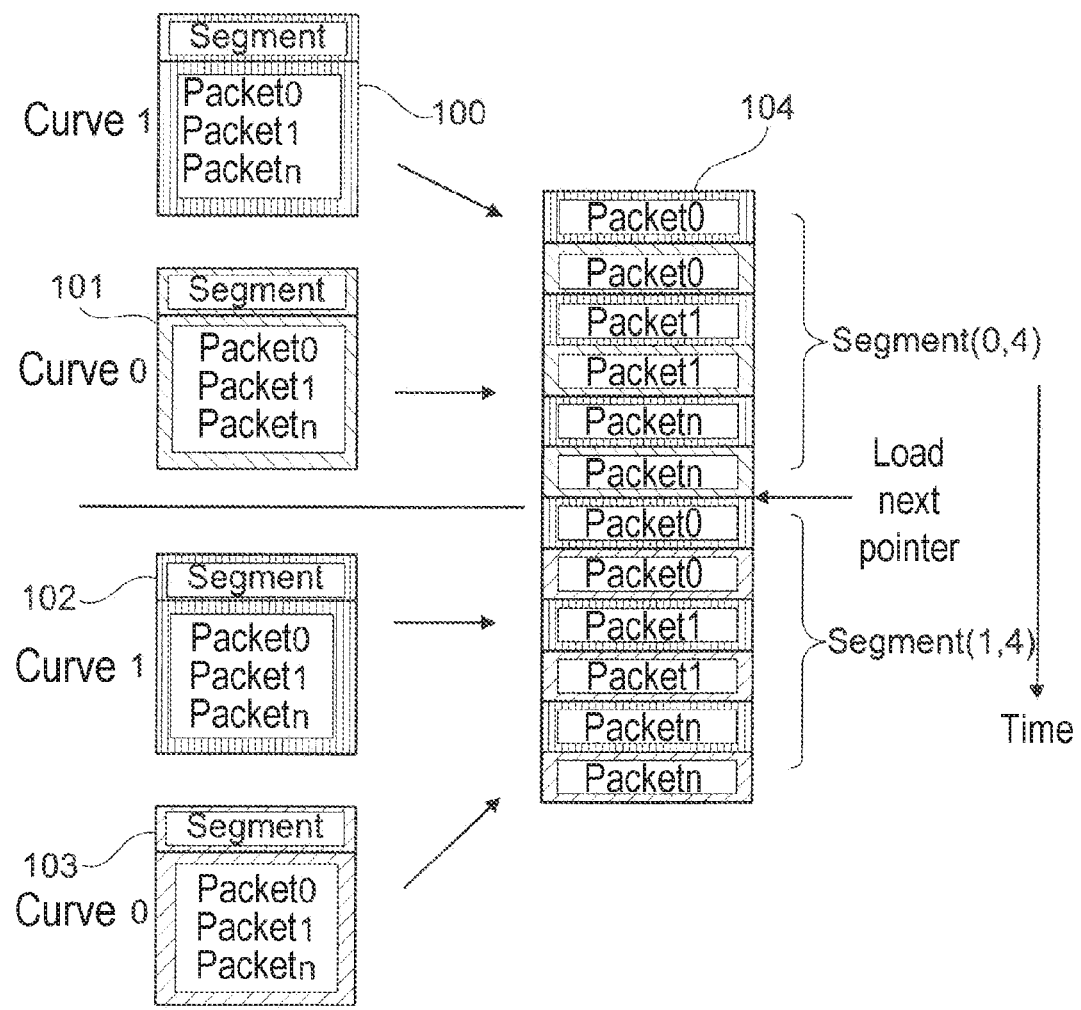
FIG. 10 is a diagram for illustrating the decompression in the case of a plurality of drive curves.
Figure 11:
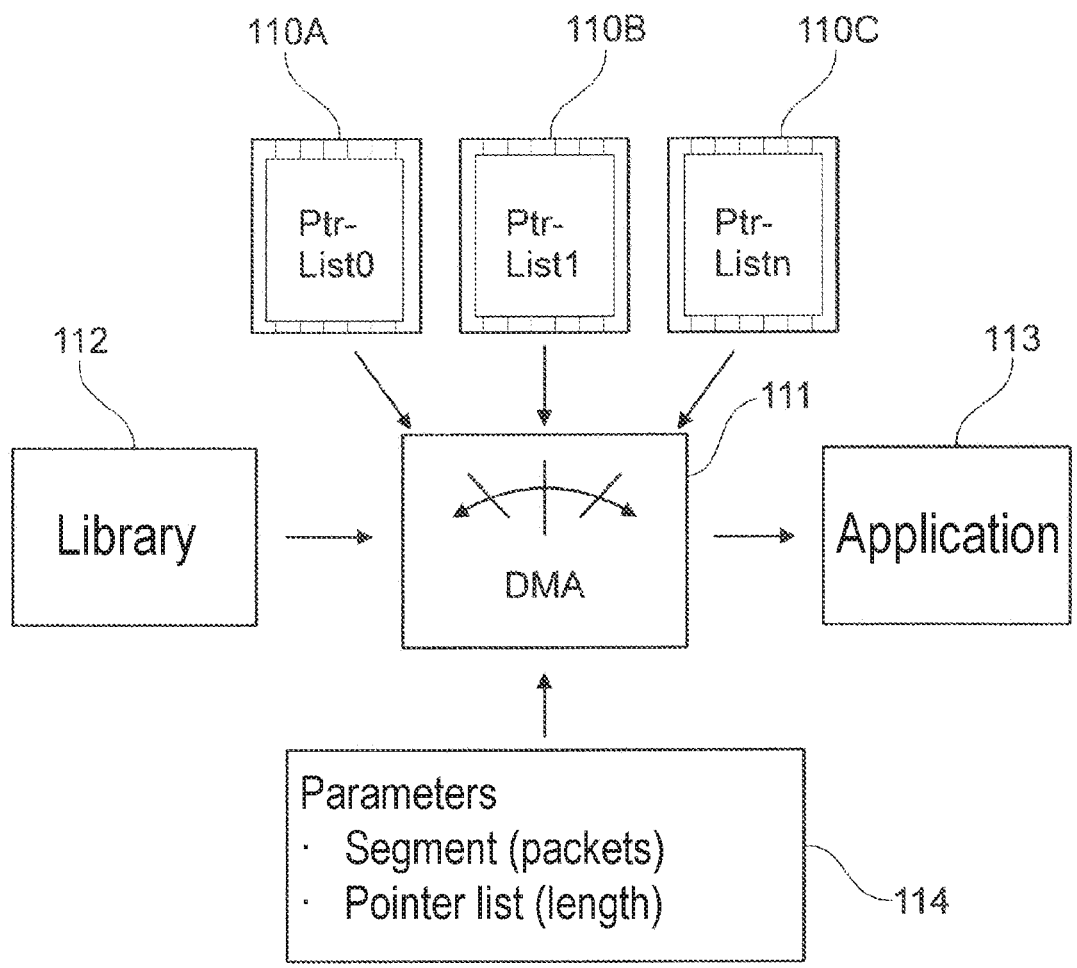
FIG. 11 is a block diagram of a part of an apparatus for decompression in the case of a plurality of drive curves.

In the exemplary embodiment in FIGS. 10 and 11, it is assumed that the control of the scanning device on the basis of the segments (step 93) takes place on the basis of packets which contain the information of the segment and which are transmitted to the scanning device. In this case, a packet can include a specific amount of data. If the amount of data of a segment (for example a number of points of the drive curve which is contained in the segment) is greater than the number of data which are communicated in a packet, a segment is communicated in a plurality of packets.

In the exemplary embodiment in FIG. 10, a scanning device is driven on the basis of two drive curves (for example the curves 30 and 60 from FIG. 6). For the driving, alternately a pointer for each drive curve is read out from the respective pointer list and the segment is read from the library and transformed, if appropriate. That is to say that steps 90-92 from FIG. 9 are carried out alternately for the pointer lists associated with the two curves (for example the pointer lists 50 and 81 from FIG. 8).

In the exemplary embodiment in FIG. 10, each segment is stored in the form of n packets in the library. In the example in FIG. 10, a segment 100 of the curve 1, a segment 101 of the curve 0, a segment 102 of the curve 1 and a segment 103 of the curve 0 are stored in each case in n associated packets in the library, etc. In the case of the example in FIGS. 6-8, the segment 100 can then correspond to the segment s00 of the curve 60, the segment 101 can correspond to the segment s0 of the curve 30, the segment 102 can correspond to the segment s01 of the curve 60, the segment 103 can correspond to the segment s1 of the curve 30, etc. It should be noted that, in other variants, the segments can also be stored in a form other than in packets, and can then be packetized into packets e.g. only upon read-out. The packets can each comprise a header and a data section containing points of the respective segment.

For communication, packets from the two curves are then alternately read from the library, as is illustrated in a block 104, and communicated to the scanning device, which serves here as an example of a data sink. For synchronously driving a plurality of components, in this case it is possible to provide a synchronization device which synchronizes the output to the plurality of components.

By way of example, in FIG. 10, firstly the packet 0 of the segment 100 is communicated, then the packet 0 of the segment 101, then the packet 1 of the segment 100, then the packet 1 of the segment 101, etc. until all packets of the segments 100, 101 have been communicated. In this case, the packets can be addressed by subpointers to the pointers that point to the segments. Then, as indicated by an arrow in FIG. 10, the next pointers of the two curves are processed, and the packets of the next segments 102, 103 are transmitted alternately. For this purpose, a read-out device that implements the method from FIG. 9 requires information about the size of the segments (i.e. how many packets are necessary per segment, corresponding to the amount of data (corresponding to the length) of the segments divided by the amount of data (corresponding to the length) per packet), such that the apparatus knows when the next pointer must be processed. This can be carried out by means of a counter, for example, which counts the number of processed packets and decides that a segment has been ended when the number of packets reaches a predefined value. It should be noted that, in other exemplary embodiments, the alternating read-out need not be uniform. By way of example, packets from segments can be read more often for one drive curve than for another drive curve, depending on the requirement of driving for the respective devices which are driven on the basis of the drive curves.

Such read-out from the library can be used in particular by means of a Direct Memory Access apparatus (DMA apparatus) which for example directly accesses the storage device 18 from FIG. 1, in which the compressed drive curves (pointer lists and library) are stored, without having to use a processor such as the processor 17 for this purpose. In other apparatuses, the method can also be carried out only by the processor without the use of a DMA apparatus. In still other exemplary embodiments, the DMA apparatus can be part of a computing device which, as explained above, can also be implemented on the basis of specific hardware components.

One example of such a use of a DMA apparatus is shown in FIG. 11. FIG. 11 shows a DMA apparatus 111 which, as explained with reference to FIG. 10, reads in turn pointers from pointer lists for different drive curves, three pointer lists 110A, 110B and 110C in the example in FIG. 11. The DMA apparatus 111 then furthermore reads the corresponding packets of the segments from the library 112 and transforms them (for example by selection of a corresponding read-out direction and multiplication by a sign as discussed), and transmits the packets as explained with reference to FIG. 10, for example, to an application, in particular a scanning device 113. For this purpose, as likewise explained, the DMA apparatus 111 receives as parameters 114 a length of the pointer list, in order to know when the last pointer has been reached (yes in step 94 in FIG. 9), and information regarding the number of packets among which each segment is divided. It should be noted that, in other exemplary embodiments, packetization into packets does not take place, rather a scanning device is controlled directly on the basis of the segments read out.

In this way, it is possible for a plurality of data channels to be handled in a manner corresponding to a plurality of drive curves, wherein the parameters 114, in particular the length of the pointer list, must be present for each pointer list (single presence is sufficient if the length is identical for all the pointer lists).

As a result of the use of a DMA apparatus, only relatively few resources are necessary even for a plurality of drive curves, since only one DMA apparatus is used for a plurality of channels, which is implementable relatively cost-effectively for example by means of an FPGA (Field Programmable Gate Array).

With regard to the various modifications discussed above, it is evident that the exemplary embodiments presented serve only for illustration and should not be interpreted as restrictive. Although the method can be implemented by means of computer programs on processors, as described with reference to FIG. 1, FIG. 11, for example, shows that hardware components such as a DMA apparatus can also be used.

What is claimed is:

1. A computer-aided method for compressing drive curves for a scanning device, the method comprising:
   subdividing a drive curve of the scanning device into segments, and
   for each of the segments, performing operations comprising:
     checking whether a corresponding segment that corresponds to a respective segment of the segments is present in a library,
     when the corresponding segment that corresponds to the respective segment is not present in the library, incorporating the corresponding segment as corresponding to the respective segment into the library, and
     when the corresponding segment is present in the library, or after the corresponding segment is incorporated as corresponding to the respective segment into the library, incorporating a pointer indicating the corresponding segment in the library into a pointer list,
   wherein the scanning device is configured to be controlled by a voltage or current that is based on the drive curve.

2. The method according to claim 1, wherein the corresponding segment is present in the library if an identical one of the respective segment is present in the library.

3. The method according to claim 1, wherein the corresponding segment is present in the library if a different segment that differs from the respective segment by not more than a predefined measure is present in the library.

4. The method according to claim 1,
   wherein the corresponding segment that corresponds to the respective segment is present in the library if the corresponding segment is transformable into the respective segment is present in the library, and
   wherein incorporating the pointer to the corresponding segment into the pointer list further comprises incorporating into the pointer list at least one transformation parameter defining a transformation of the corresponding segment in the library to the respective segment.

5. The method according to claim 4, wherein the at least one transformation parameter comprises a read-out direction of the corresponding segment from the library.

6. The method according to claim 4, wherein the at least one transformation parameter comprises a sign with which a corresponding one of the segments in the library which is indicated by the pointer is to be provided.

7. The method according to claim 4, wherein the at least one transformation parameter comprises an offset and/or a scaling factor for the corresponding one of the segments of the library which is indicated by the pointer.

8. The method according to claim 1, wherein the method is applied to a plurality of drive curves.

9. The method according to claim 8, wherein the library comprises a shared library for the plurality of drive curves.

10. The method according to claim 8, wherein the pointer list is created separately for each of the plurality of drive curves.

11. The method according to claim 1, wherein the segments are stored in a form of packets in the library.

12. A computer program comprising a program code which, when executed on a computing device, causes the method according to claim 1 to be performed.

13. An apparatus for compressing drive curves for a scanning device, comprising a computing device, which is configured to perform the method according to claim 1.

14. A system comprising:
   a scanning device for scanning a sample, and
   at least one apparatus according to claim 13.

15. A computer-aided method for decompressing a drive curve for a scanning device, the method comprising:
   reading from a pointer list a pointer indicating a segment in a segment library,
   reading from the library the segment which is indicated by the pointer,
   driving a data sink based on the segment, and
   repeating, for a plurality of pointers in the pointer list, the reading from the pointer list, the reading from the library the segment, and the driving the data sink.

16. The method according to claim 15, wherein the driving the data sink based on the segment comprises:
   controlling based on a transformed segment,
   wherein at least one transformation parameter for transforming the segment read from the library is read together with the pointer from the pointer list.

17. The method according to claim 16, wherein the at least one transformation parameter comprises a read-out direction of the segment from the library.

18. The method according to claim 16, wherein the at least one transformation parameter comprises a sign with which the transformed segment in the library pointed to by the pointer is to be provided.

19. The method according to claim 16, wherein the at least one transformation parameter comprises an offset and/or a scaling factor for the segment of the library which is indicated by the pointer.

20. The method according claim 15,
wherein the method performed for a plurality of pointer lists defining a plurality of drive curves, and
wherein the reading from the pointer list, reading from the library, and the driving the data sink are carried out uniformly or non-uniformly alternately for the plurality of pointer lists.

21. The method according to claim 20, wherein the reading from the pointer list and the reading from the library are carried out using a direct memory access apparatus.

22. The method according to claim 15,
wherein the reading of the segment from the library comprises reading one or more packets from the library, and
wherein the packets are transmitted to the data sink.

23. The method according to claim 22, wherein packets assigned to different pointer lists are transmitted alternately.

24. A computer program comprising a program code which, when executed on a computing device, causes the method according to claim 15 to be performed.

25. An apparatus for decompressing a drive curve for a scanning device, comprising a computing device, which is configured to perform the method according to claim 15.

* * * * *